(12) United States Patent
Andrews et al.

(10) Patent No.: US 8,406,209 B2
(45) Date of Patent: Mar. 26, 2013

(54) POWER CONTROL IN A WIRELESS COMMUNICATION SYSTEM

(75) Inventors: Edward Andrews, St. Andrews (GB); Jonathan Wallington, Portishead (GB); Carlo Luschi, Duke Street (GB)

(73) Assignee: ICERA Inc., Wilmington, DE (US)

( * ) Notice: Subject to any disclaimer, the term of this patent is extended or adjusted under 35 U.S.C. 154(b) by 332 days.

(21) Appl. No.: 12/808,173

(22) PCT Filed: Dec. 11, 2008

(86) PCT No.: PCT/EP2008/067310
§ 371 (c)(1),
(2), (4) Date: Aug. 17, 2010

(87) PCT Pub. No.: WO2009/077417
PCT Pub. Date: Jun. 25, 2009

(65) Prior Publication Data
US 2010/0309850 A1    Dec. 9, 2010

(30) Foreign Application Priority Data
Dec. 14, 2007 (GB) .................................. 0724417.1

(51) Int. Cl.
*H04B 7/216* (2006.01)
(52) U.S. Cl. ....................................................... 370/342
(58) Field of Classification Search .......... 370/328–339, 370/342, 441; 455/69, 70, 522, 13.4
See application file for complete search history.

(56) References Cited

U.S. PATENT DOCUMENTS

| | | | | |
|---|---|---|---|---|
| 6,529,482 B1 * | 3/2003 | Lundby | ......................... | 370/252 |
| 6,639,934 B1 * | 10/2003 | Engstrom et al. | ............. | 375/130 |
| 6,909,880 B2 * | 6/2005 | Kojima et al. | ............... | 455/63.1 |
| 6,944,468 B2 * | 9/2005 | Okumura | ....................... | 455/522 |
| 6,944,470 B2 * | 9/2005 | Qian et al. | ..................... | 455/522 |
| 7,010,321 B2 * | 3/2006 | Chi et al. | ....................... | 455/522 |
| 2005/0143116 A1 * | 6/2005 | Hsu et al. | ....................... | 455/522 |

FOREIGN PATENT DOCUMENTS

| | | |
|---|---|---|
| EP | 1311076 A1 | 5/2003 |
| WO | 0045528 A1 | 8/2000 |
| WO | 03032518 A1 | 4/2003 |
| WO | 2009077417 A1 | 6/2009 |

\* cited by examiner

*Primary Examiner* — Frank Duong

(57) ABSTRACT

A method of power control in a wireless communications system wherein blocks are transmitted from a transmitter to a receiver via a wireless transmission channel. The method comprises comparing a target signal quality value with a received signal quality value and providing the results of the comparing step to the transmitter to adjust transmit power based on the comparing step. The target signal quality value is set by the following steps: determining an initial target value; determining if received blocks have been successfully decoded; identifying the received blocks as pass or fail blocks; when pass blocks are received, comparing the target signal quality value with the received signal quality value and decreasing the target value only if the target value is greater than the received signal quality value less a margin.

15 Claims, 4 Drawing Sheets

POWER CONTROL IN A WIRELESS COMMUNICATION SYSTEM

CROSS-REFERENCE TO RELATED APPLICATION

This application is the National Stage of, and therefore claims the benefit of, International Application No. PCT/EP2008/067310 filed on Dec. 11, 2008, entitled "POWER CONTROL IN A WIRELESS COMMUNICATION SYSTEM," which was published in English under International Publication Number WO 2009/077417 on Jun. 25, 2009, and has a priority date of Dec. 14, 2007, based on the application GB 0724417.1. Both of the above applications are commonly assigned with this National Stage application and are incorporated herein by reference in their entirety.

TECHNICAL FIELD

This application is directed, in general, to a power control in a wireless communication system.

BACKGROUND

FIG. 1 is a schematic block diagram indicating the main functional components of a 3GPP wideband code division multiple access (WCDMA) receiver. Reference numeral 2 denotes an antenna which receives a wireless transmission and supplies it in analog form to RF and IF stages 4. A receiver front end 6 includes the functions of analog to digital conversion and supplies digital samples to a signal detection block 8. The signal detection block 8 can be implemented in a number of ways and is responsible for de-scrambling and de-spreading the received coded signal samples. The signal to interference plus noise ratio or signal to disturbance ratio (SIR) of the received signal can be measured from the output of the signal detection block 8, in an SIR estimation block 9. For each time slot a block is received which comprises a plurality of transport channels (TrCH) multiplexed onto a dedicated physical channel (DPCH in 3GPP WCDMA). As shown in FIG. 1, after signal detection and channel decoding, the decoded data bits are supplied to a Cyclic Redundancy Check (CRC) block 12. The CRC check indicates whether or not the data block has been correctly decoded.

For interference-limited wireless systems, such as those based on CDMA technology, link adaptation is performed by a Transmit Power Control (TPC) mechanism, which ensures that sufficient but not excessive power is transmitted to achieve an adequate received signal quality. In a 3GPP WCDMA system, the power control mechanism comprises two parts: 1) a so-called "outer-loop" algorithm 14 that sets and adjusts a target signal to interference plus noise power ratio (SIR) in order to meet a Block Error Rate (BLER) target set by a network; and 2) a so-called "inner-loop" algorithm 16 that provides fast feedback to the transmitter in order that the transmitter can adjust its transmitted signal power so that the receiver SIR target is met. The inner-loop transmit power control 16 is typically based on the comparison between a target SIR ($SIR_{target}$) and an SIR estimated from the received signal ($SIR_{est}$). The outer-loop mechanism 14 increases or decreases the SIR target in response to the receipt of block error information, which is typically derived by the pass/fail of the CRC check 12. If a data block is received correctly (CRC pass), then the SIR target is decreased; if a data block is received incorrectly (CRC fail), then the SIR target is increased. In a typical implementation, the amount the SIR target is decreased following a correctly decoded block is equal to some step size (in dB) multiplied by the target block error rate, and the amount the SIR target is increased following an incorrectly decoded block is equal to the step size multiplied by one minus the target block error rate. For example, for a 10% BLER target and a 1 dB step size, the SIR target will be decreased by 1*0.1=0.1 dB following a good block and increased by 1*(1−0.1)=0.9 dB following a bad block. This has the effect that, for typical BLER targets, many more good blocks are required to lower the target than bad blocks to raise it by the same amount. In normal circumstances, the inner-loop power control is able to adjust the transmitted power to meet the new target in a short period (in WCDMA the power can be changed by 1 dB per slot). This "normal case" is illustrated in FIG. 2, which is a graph of the SIR measure (----) and SIR target (—) over time, where time may be measured in number of Transmission Time Intervals (TTIs), number of slots, number of radio frames, or other units. However, under certain conditions, such as when the transmitter has reached its minimum allowed transmit power, it may be the case that the actual SIR estimated at the receiver cannot decrease as low as the target SIR. In that case it is likely that the BLER will be lower than the target rate (it could even be zero) so the SIR target will keep being decreased even though there is no possibility of the actual SIR tracking it, as illustrated in FIG. 3. If conditions then change, for example by the receiver moving further away from the transmitter, the very low SIR target will cause the inner-loop power control to dramatically lower the transmit power, possibly causing the receiver to lose synchronization ("out-of-sync") with the transmitter with the result that the call could be dropped.

It is an aim of the present invention to obviate or at least mitigate the disadvantages discussed above.

SUMMARY

In one aspect there is provided a method of power control in a wireless communications system wherein blocks are transmitted from a transmitter to a receiver via a wireless transmission channel, the method comprising comparing a target signal quality value with a received signal quality value and providing the results of the comparing step to the transmitter to adjust transmit power based on the comparing step, wherein the target signal quality value is set by the following steps: determining an initial target value; determining if the received blocks have been successfully decoded; identifying the received blocks as pass or fail blocks; and when pass blocks are received, comparing the target signal quality value with the received signal quality value and decreasing the target value only if the target value is greater than the received signal quality value less a margin.

Another aspect of the invention provides a receiver for a wireless communications system, the receiver comprising: means for detecting blocks transmitted from a transmitter to the receiver via a wireless transmission channel and detecting blocks as pass or fail; means for comparing the target signal quality value with a received signal quality value, said means operable to decrease the target value when pass blocks are received only if the target value is greater than the received signal quality value less a margin.

The invention also provides a communication system having a transmitter and a receiver where the transmitter is operable to adjust transmit power based on the result of comparing the target signal quality value with the received signal quality value.

BRIEF DESCRIPTION OF THE DRAWINGS

For a better understanding of the present invention and to show how the same may be carried into effect, reference will now be made by way of example to the accompanying drawings, in which.

DETAILED DESCRIPTION

Those skilled in the art to which this application relates will appreciate that other and further additions, deletions, substitutions and modifications may be made to the described embodiments.

Figure 4:
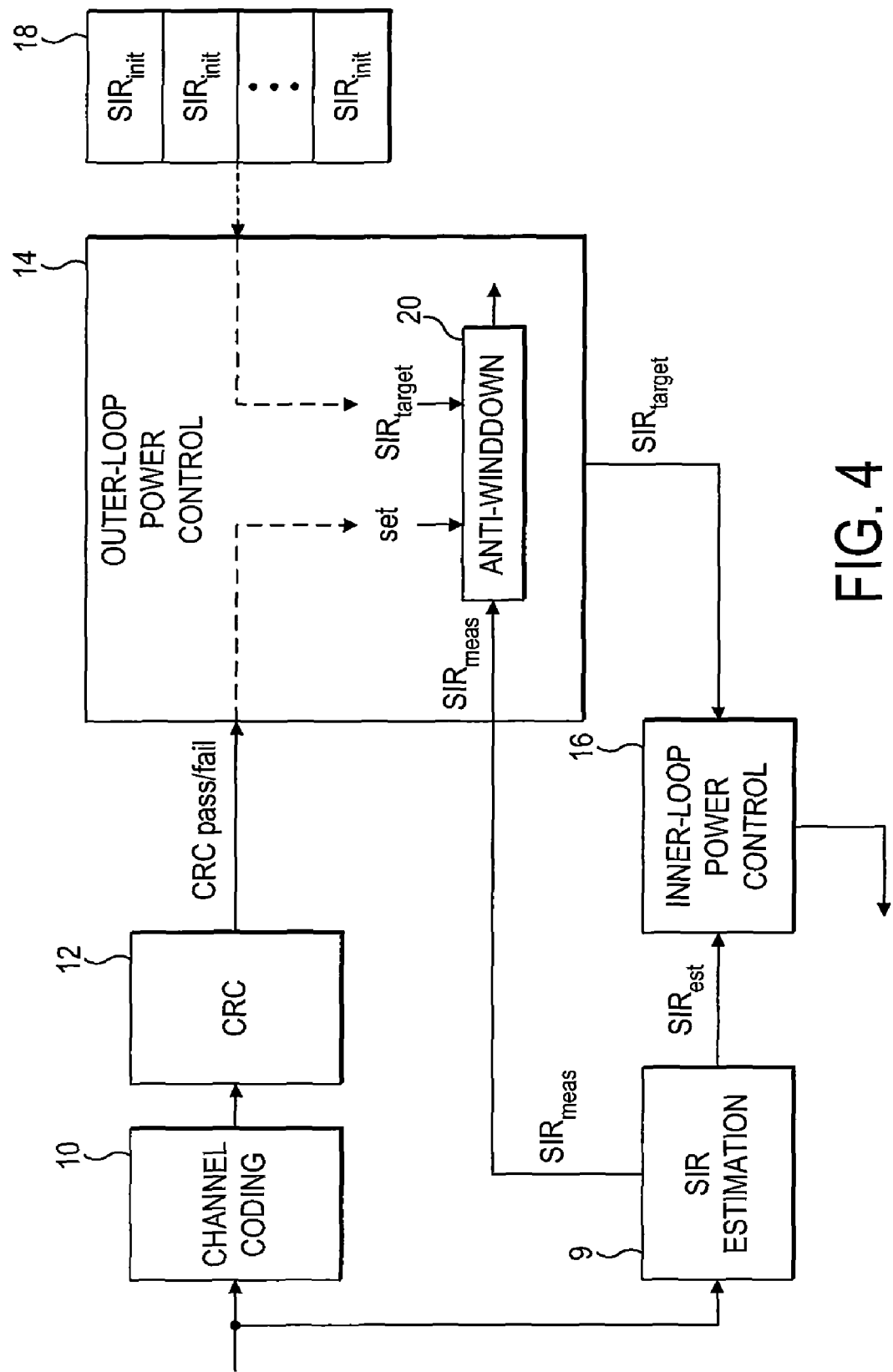
FIG. 4 is a schematic block diagram of an anti-winddown mechanism in accordance with one embodiment of the present invention.

FIG. 4 is a schematic block diagram illustrating an anti-winddown mechanism in accordance with one embodiment of the invention. It will readily be appreciated that in practice the functional blocks which are shown in FIG. 4 can be implemented by software or firmware in a suitably programmed processor.

Figure 1:
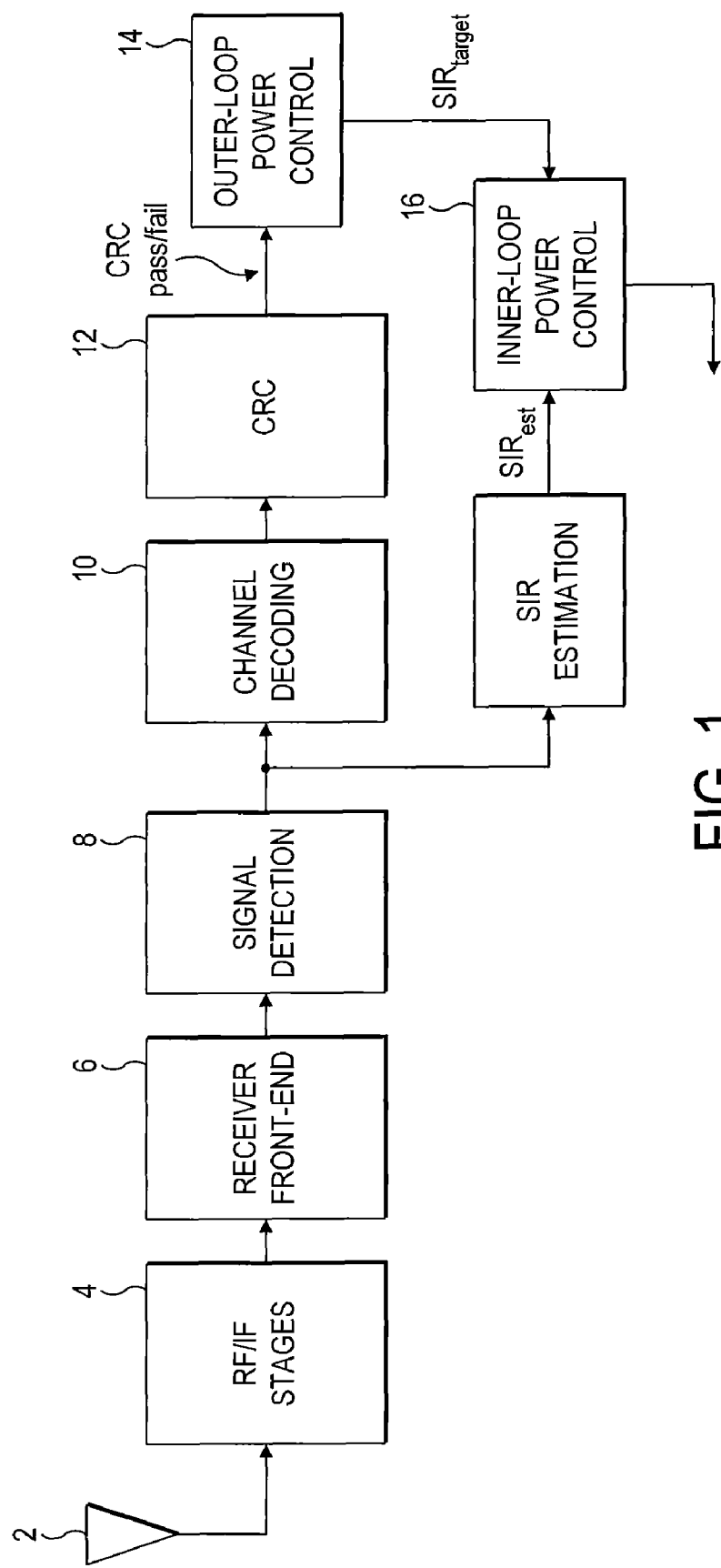
FIG. 1 is a schematic block diagram of a receiver.
Figure 2:
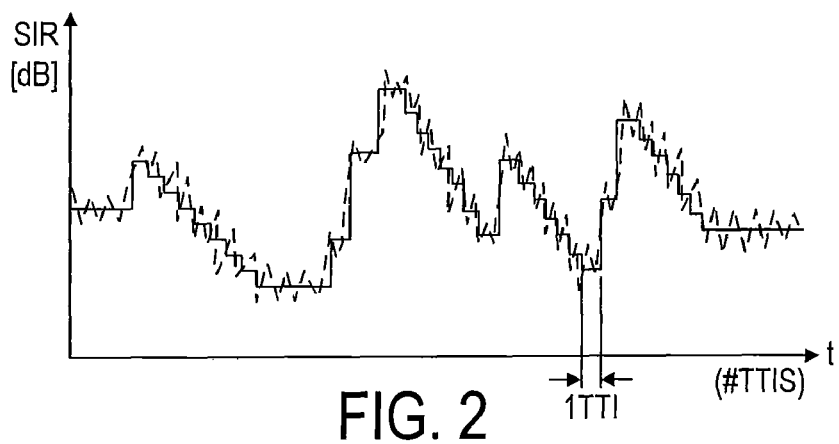
FIG. 2 is a graph illustrating the change of SIR measure and SIR target with time in a normal case.

FIG. 4 shows the CRC check block 12, the outer loop power control block 14 and the inner loop power control block as in FIG. 1 already discussed. The described embodiment of the present invention provides an anti-winddown mechanism which prevents the outer loop SIR target dropping excessively below the actual measured SIR at the receiver.

The outer-loop power control block 14 maintains and uses separate SIR targets for each transport channel (TrCH) multiplexed onto a dedicated physical channel (DPCH). These targets are held in the memory block 18 of FIG. 4. The set of transport channel SIR targets is initialized to some set of typical values $SIR_{init}$ at call setup, where the value of $SIR_{init}$ for a particular transport channel may depend upon a number of factors related to, for example, the properties of the DPCH (e.g., spreading factor) or the properties of the transport channel (e.g., BLER target). The SIR target $SIR_{target}$ which is used by the inner loop power control 16 is calculated from the current set of constituent targets (for example by taking the instantaneous largest target).

According to the known power control mechanism, the outer loop power control block 14 increases or decreases the SIR target of each transport channel in response to the receipt of block error information from the CRC block 12. If a data block is received correctly (CRC pass), then the SIR target is decreased; if a data block is received incorrectly (CRC fail) then the SIR target is increased, as described above with reference to FIG. 1.

Figure 3:
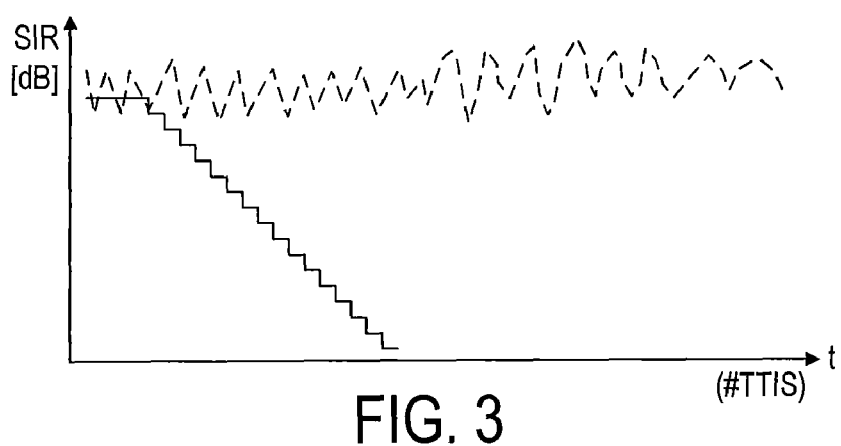
FIG. 3 is a graph showing the change of SIR target and SIR measure with time in a problematic case.

According to the described embodiment of the present invention and to avoid the problems with this approach discussed above and as illustrated in FIG. 3, where a transport channel's SIR target is reduced following a transmission time interval (TTI) with good blocks (CRC passes), then the SIR target for that transport channel is prevented from being reduced again until such time when the SIR target becomes greater than some measure of the received SIR ($SIR_{meas}$) less some margin Δ. The margin may be a multiplicative factor in linear scale or equivalently an additive term in dB. In order to achieve this, the anti-winddown mechanism compares the SIR target for each transport channel to the received SIR measure $SIR_{meas}$ at least once per TTI, in order to activate the anti-winddown mechanism or allow the transmit power control algorithm to progress unimpeded when anti-winddown is not active.

Exemplary values of the anti-winddown margin Δ are as follows. For a WCDMA DPCH channel, a typical value of the margin of is 3 dB—that is, the target cannot become less than half the actual measured SIR value. For a 3GPP Release-6 Fractional DPCH (F-DPCH) channel, a typical value of the anti winddown margin is 6 dB—that is, the target cannot become less than a quarter the actual measured SIR value. A larger value is chosen for the F-DPCH because SIR estimation for the F-DPCH channel is less reliable due to the lack of dedicated pilot bits, so that the value of the measured SIR is likely to be subject to larger fluctuations. If the margin chosen is too small, then anti-winddown may be triggered prematurely and possibly even in cases where it would not be appropriate to do so.

In one implementation, the anti-winddown mechanism is activated every time a transport channel's SIR target is lowered. The measure of received SIR is generated for instance by individually filtering the instantaneous (e.g., per slot) signal power, $P_S$, and the instantaneous interference plus noise power, $P_I$, and computing the ratio of the two, $P_S/P_I$. The value of $P_S/P_I$ in dB minus the margin Δ in dB is compared to each transport channel's SIR target every slot, and the anti-winddown is deactivated if $P_S/P_I$ in dB minus the margin Δ in dB ever drops below the target (so that the target is within ΔdB of the measured SIR).

Figure 5:
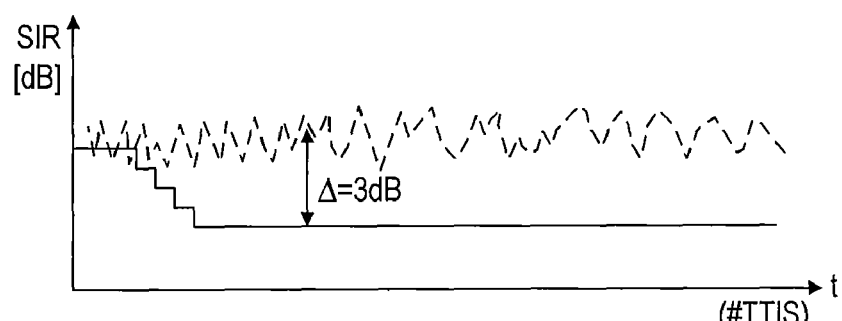
FIG. 5 is a graph showing the change of SIR target and SIR measure with time when the anti-winddown mechanism is used effectively.

The effect of the anti-winddown mechanism is shown in FIG. 5, where Δ denotes the margin in dB.

Figure 6:
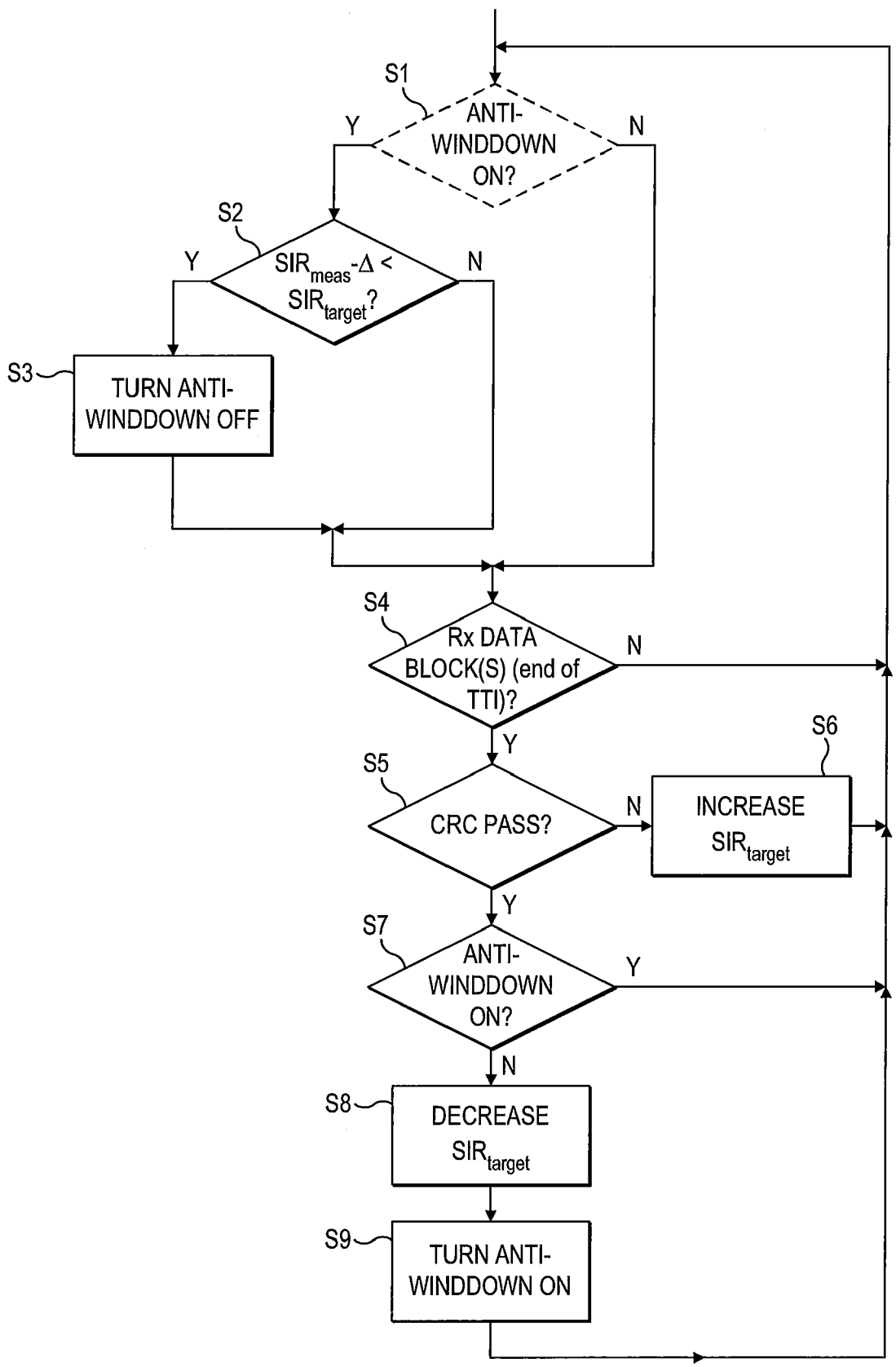
FIG. 6 is a flow chart.

The operation of one implementation is summarized in the flow chart of FIG. 6. At a step S1, it is determined whether or not the anti-winddown feature is on or not. This is to allow the feature to be activated on a per transport channel basis. Assuming that it is, at a step S2 the measure of received SIR ($SIR_{meas}$) less than the margin Δ is compared with the target value ($SIR_{target}$) If it is less than the target value, the anti-winddown is turned off at a step S3. If it is not, the process proceeds to a step S4. Step S4 checks the number of received data blocks to determine whether or not it is at the end of a transmission time interval. If not, the process returns to step S1. If it is the end of a transmission time interval, at a step S5 it is checked whether or not the block has been successfully decoded, i.e., has passed the CRC check. If it has not, the target is increased at a step S6. If the block has passed the CRC check, at a step S7 it is assessed whether the anti-winddown feature is on or not. If the anti-winddown feature is on, the process returns to step S1 to compare the measured SIR value less the margin Δ with the target. If anti-winddown is not on, the target is decreased at a step S8 and the process then proceeds to turn the anti-winddown on at a step S9.

The described embodiment of the present invention has the advantage that it prevents SIR targets from dropping artificially far below the currently measured SIR. The importance of this can be seen when considering the case of a user equipment (UE) which starts in close proximity to a base station (Node B) and then moves away. When close to the base station, the power transmitted to the user equipment may be too high even when the base station is transmitting at its minimum power level. Thus, without the proposed mechanism, the user equipment's SIR target is driven way below the actual measured SIR. As the user equipment moves away from the base station, the inner loop power control will become able to reduce the actual SIR down to the SIR target, possibly reducing it so low so quickly that the user equipment becomes out-of-sync with the base station and the call is dropped. By using the anti-winddown mechanism discussed above, the user equipment's SIR target when in proximity to the base station would be prevented from dropping too low and thus the problem of out-of-sync when the user equipment moved away would never occur.

Although the anti-winddown mechanism has been described in the context of multiple transport channels, it will readily be appreciated that it is also applicable in the case where there is only one transport channel. In the case of multiple transport channels, it is possible to include a refinement where the receiver judges if anti-winddown should be active on a per transport channel basis, that is some transport channels may be in anti-winddown while others are not.

What is claimed is:

1. A method of power control in a wireless communications system wherein blocks are transmitted from a transmitter to a receiver via a wireless transmission channel, the method comprising:
   comparing a target signal quality value with a received signal quality value and providing the results of the comparing step to the transmitter to adjust transmit power based on the comparing step, wherein the target signal quality value is set by the following steps:
   determining an initial target value;
   determining if received blocks have been successfully decoded;
   identifying the received blocks as pass or fail blocks; and
   when pass blocks are received, comparing the target signal quality value with the received signal quality value and decreasing the target value only if the target value is greater than the received signal quality value less a margin.

2. A method according to claim 1, wherein blocks are transmitted via multiple transport channels and wherein an initial target value is set for each transport channel and a signal quality target is maintained for each transport channel, the target signal quality value used in the comparing step being derived from the multiple signal quality target values.

3. A method according to claim 1, wherein the target signal quality value is a signal to disturbance ratio for the channel.

4. A method according to claim 2, comprising the step of estimating the received signal quality value for each transport channel or jointly for multiple transport channels.

5. A method according to claim 4, wherein the step of estimating the received signal quality value is determined for each time slot of transmission of the blocks.

6. A method according to claim 1, wherein the margin is linear.

7. A method according to claim 1, wherein the margin is multiplicative, that is additive when expressed in logarithmic scale (e.g., in dB).

8. A method according to claim 1, wherein the target signal quality value is increased when fail blocks are received.

9. A receiver for a wireless communications system, the receiver comprising:
   means for detecting blocks transmitted from a transmitter to the receiver via a wireless transmission channel;
   means for determining if blocks have been successfully decoded and means for identifying blocks as pass or fail;
   means for comparing the target signal quality value with a received signal quality value and decreasing the target value when pass blocks are received only if the target value is greater than the received signal quality value less a margin.

10. A receiver according to claim 9, wherein the target signal quality value is increased when fail blocks are received.

11. A receiver according to claim 9, wherein the comparing means is operable to carry out its comparing function at least once for each time slot.

12. A receiver according to claim 9, comprising means for storing initial target values for multiple transport channels and maintaining separate target signal quality values for multiple transport channels, wherein the target signal quality value which is compared with the received signal quality value is derived from said multiple targets.

13. A receiver according to claim 9, comprising means for estimating the received signal quality value.

14. A wireless communications system comprising a receiver according to claim 9 and a transmitter, wherein the transmitter is operable to adjust transmit power based on the result of comparing the target signal quality value with the received signal quality value.

15. A wireless communications system according to claim 14, wherein the result of comparing the target signal quality value with the received signal quality value is supplied to the transmitter via the wireless transmission channel.

* * * * *

UNITED STATES PATENT AND TRADEMARK OFFICE
CERTIFICATE OF CORRECTION

PATENT NO.         : 8,406,209 B2                                                Page 1 of 1
APPLICATION NO.    : 12/808173
DATED              : March 26, 2013
INVENTOR(S)        : Edward Andrews, Jonathan Wallington and Carlo Luschi It is certified that error appears in the above-identified patent and that said Letters Patent is hereby corrected as shown below:

In the Claims:

In Column 6, Claim 9, Line 16, delete the words "decoded and" and insert --decoded;--

In Column 6, Claim 9, Line 16, after the word --fail;-- insert the word --and--

Signed and Sealed this
Seventeenth Day of September, 2013

Teresa Stanek Rea
*Deputy Director of the United States Patent and Trademark Office*